T. A. KERSHNER.
REVOLVING HARROW AND PULVERIZER.

No. 179,320. Patented June 27, 1876.

WITNESSES:
Gustave Dieterich
John Goethals

INVENTOR:
T. A. Kershner
BY
ATTORNEYS.

UNITED STATES PATENT OFFICE.

THOMAS A. KERSHNER, OF SEYMOUR, ASSIGNOR TO HIMSELF AND ALEXANDER CARR, OF MEDORA, INDIANA.

IMPROVEMENT IN REVOLVING HARROWS AND PULVERIZERS.

Specification forming part of Letters Patent No. 179,320, dated June 27, 1876; application filed January 15, 1876.

*To all whom it may concern:*

Figure 1:
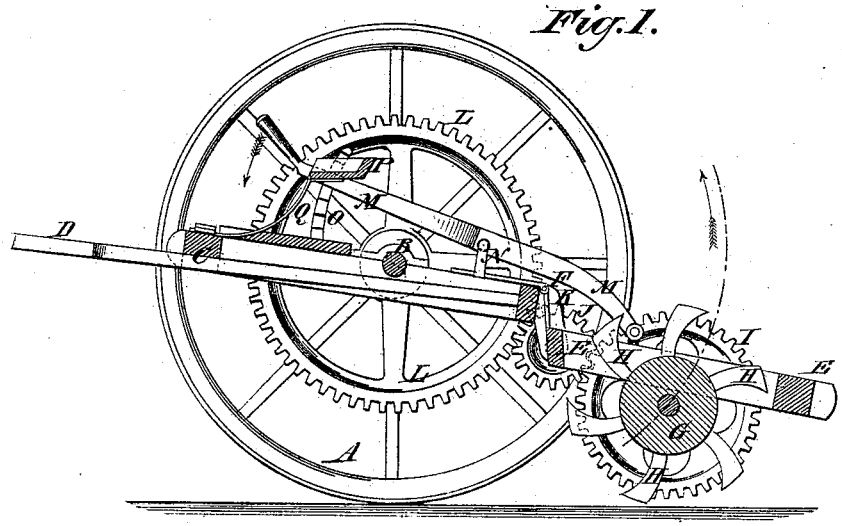
Figure 2:
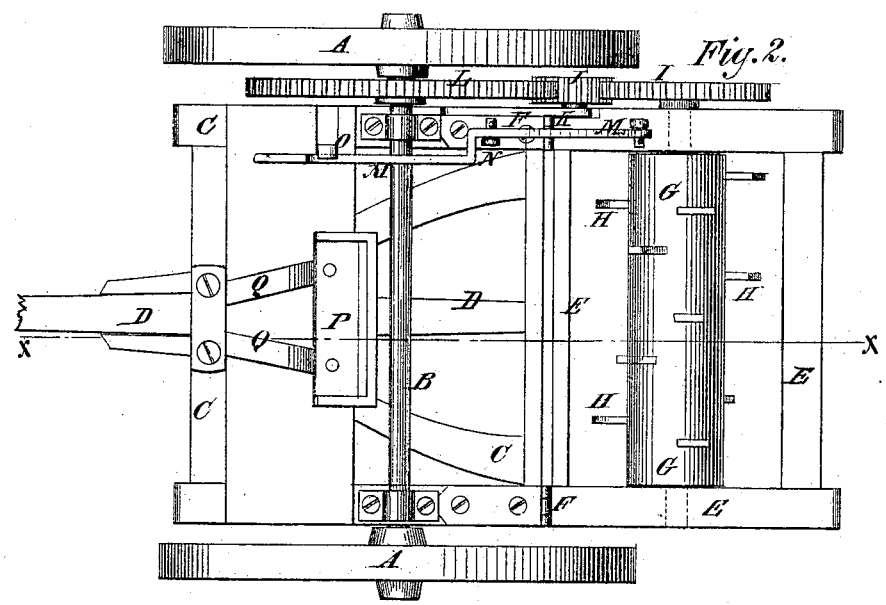

Be it known that I, THOMAS ALEXANDER KERSHNER, of Seymour, in the county of Jackson and State of Indiana, have invented a new and useful Improvement in Revolving Harrow or Pulverizer, of which the following is a specification:

Figure 1 is a vertical longitudinal section of my improved machine. Fig. 2 is a top view of the same.

Similar letters of reference indicate corresponding parts.

The object of this invention is to furnish an improved machine for stirring up, pulverizing, and leveling plowed land, and other land, which shall be simple in construction, convenient in use, effective in operation, and not liable to become choked with trash.

The invention consists in the teeth made with curved forward edges, concaved rear edges, and broad heads pointed to the rearward, in combination with the rotating cylinder; and in the combination of the hinges, the hinged frame, and the toothed cylinder with the frame, the axle, and the wheels, as hereinafter fully described.

A are the wheels, which are rigidly attached to the axle B. The axle B revolves in bearings attached to the frame C, to which the tongue D is attached. To the rear end of the frame C is connected a frame, E, by hinges F, which hinges are made with an offset, so that the frame E may be at a lower level than the frame C. In bearings in the side bars of the frame E revolve the journals of a cylinder, G, to the face of which are attached teeth H. The teeth H are arranged in spiral lines, and their forward edges are curved, as shown in Fig. 1. The rear edges of the teeth H are concaved upon an arc of a less diameter than their forward edges, so as to leave their heads wide, and with a rearwardly-projecting point, as shown. This construction of the teeth H enables them to cut their way through grass, weeds, stubble, corn-stalks, and other trash, and prevents them from becoming choked or clogged. To one of the journals of the toothed cylinder G H is attached a gear-wheel, I, the teeth of which mesh into the teeth of a small intermediate gear-wheel, J, pivoted to a bracket or plate, K, attached to the rear part of the side bar of the frame C, so that the gear-wheel I may be thrown out of gear by turning the frame E up upon its hinges, and may be thrown into gear by lowering the said frame E into working position.

The teeth of the intermediate gear-wheel J mesh into the teeth of a large gear-wheel, L, rigidly connected with one of the wheels A, so that the toothed cylinder G H may be rotated by the advance of the machine. M is a lever, which is pivoted to a standard, N, attached to one of the side bars of the frame C near its rear end. The rear end of the lever M is pivoted to the rear or hinged frame E, and its forward end projects into such a position that it may be conveniently reached by the driver from his seat, so that by operating the said lever M the toothed cylinder may be raised from the ground, as may be desired. The forward part of the lever M moves along a standard, O, attached to the frame C, and which has notches or teeth formed in it, to receive the lever M and hold it in any position into which it may be adjusted. P is the driver's seat, the standards Q of which are attached to the forward part of the frame C, so that the driver's weight may balance the weight of the frame E and toothed cylinder G H.

Having thus described my invention, I claim as new and desire to secure by Letters Patent—

1. The teeth H, made with curved forward edges, concaved rear edges, and broad heads pointed to the rearward, in combination with the cylinder G, substantially as herein shown and described.

2. The combination, with axle B and frame C, of the hinged frame E and pendent hinges F, arranged substantially as and for the purpose specified.

THOMAS A. KERSHNER.

Witnesses:
 THOMAS McCOLLUM,
 MICHAEL A. YOATREY.